J. C. G. HÜPFEL.
Fermenting-Vats.
No. 156,089. Patented Oct. 20, 1874.
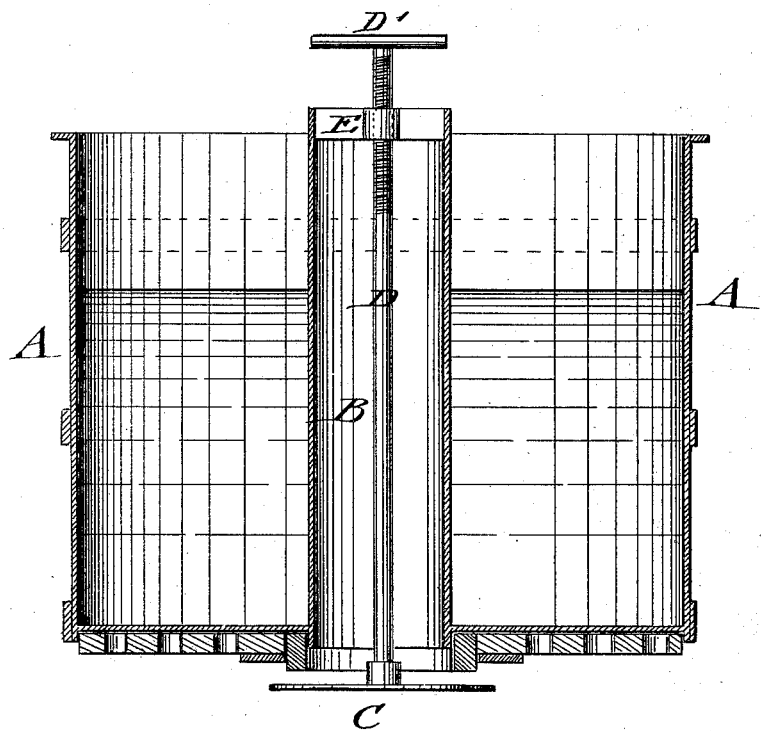

UNITED STATES PATENT OFFICE.

JOHN C. G. HÜPFEL, OF NEW YORK, N. Y.

IMPROVEMENT IN FERMENTING-VATS.

Specification forming part of Letters Patent No. 156,089, dated October 20, 1874; application filed August 22, 1874.

*To all whom it may concern:*

Be it known that I, JOHN C. G. HÜPFEL, of the city, county, and State of New York, have invented a new and Improved Fermenting-Vat, of which the following is a specification:

The accompanying drawing represents a vertical central section of my improved fermenting-vat.

The object of my invention is to provide for brewers' ice-houses an improved fermenting vat, in which the beer may be exposed in large quantities to fermentation, and kept at the requisite temperature, without the use of ice-floats. My invention consists of an open vat with one or more vertical cooling-tubes, attached securely to the bottom for the free circulation of the air, or the application of ice by means of a detachable bottom at the lower opening of the cooling-tubes.

In the drawing, A represents a brewers' fermenting-vat, which is built of any suitable material, and of a size corresponding to the quantity desired to be exposed to fermentation at one time. One or more vertical cooling-tubes, B, are firmly attached to the bottom of the vat, which is provided with corresponding openings for the same. Each cooling-tube B is suitably strengthened by metallic bands, and may be used for the free circulation of the cold air of the ice-house through the same, or, if the air should not be sufficiently cold, to keep the fermenting liquid at the required degree of temperature, a detachable bottom, C, is applied to the lower opening of the tube, and the same then filled up with ice. The bottom C is raised or lowered, as required, by a central supporting-rod, D, which is threaded at the upper end, and turned by a top hand-wheel, D', in a central cross-bearing, E, of the tube B. The position of the bottom C may be quickly changed, as required, so that the cooling-tube may be used either with cold air or with ice at any moment. The vat A is open at the top, the cold air of the ice-house acting on the fermenting liquid from the top, and, by means of the cooling-tubes, on the interior of the same. The liquid is thereby exposed to a sufficient quantity of cold air, so that the fermentation progresses in a uniform manner, and under a certain degree of temperature without requiring the ice-floats hitherto employed for this purpose. The fermentation of the beer may therefore be accomplished in greater quantities, and with increased economy and efficacy, as compared to the former mode.

Having thus described my invention, I claim as new and desire to secure by Letters Patent—

1. A fermenting-vat for brewers' ice-houses, provided with one or more vertical cooling-tubes for the circulation of the cold air and the more efficient cooling of the fermenting liquid, substantially as and for the purpose set forth.

2. The vertical cooling-tube, having an adjustable bottom for closing the bottom opening that the tube may be filled with ice, substantially as set forth.

JOHN C. G. HÜPFEL.

Witnesses:
G. SICHLER,
FREDERICK HESSE.